March 5, 1946. R. W. ALLEN 2,396,142
FASTENER ASSEMBLY
Filed Jan. 19, 1944 2 Sheets-Sheet 1
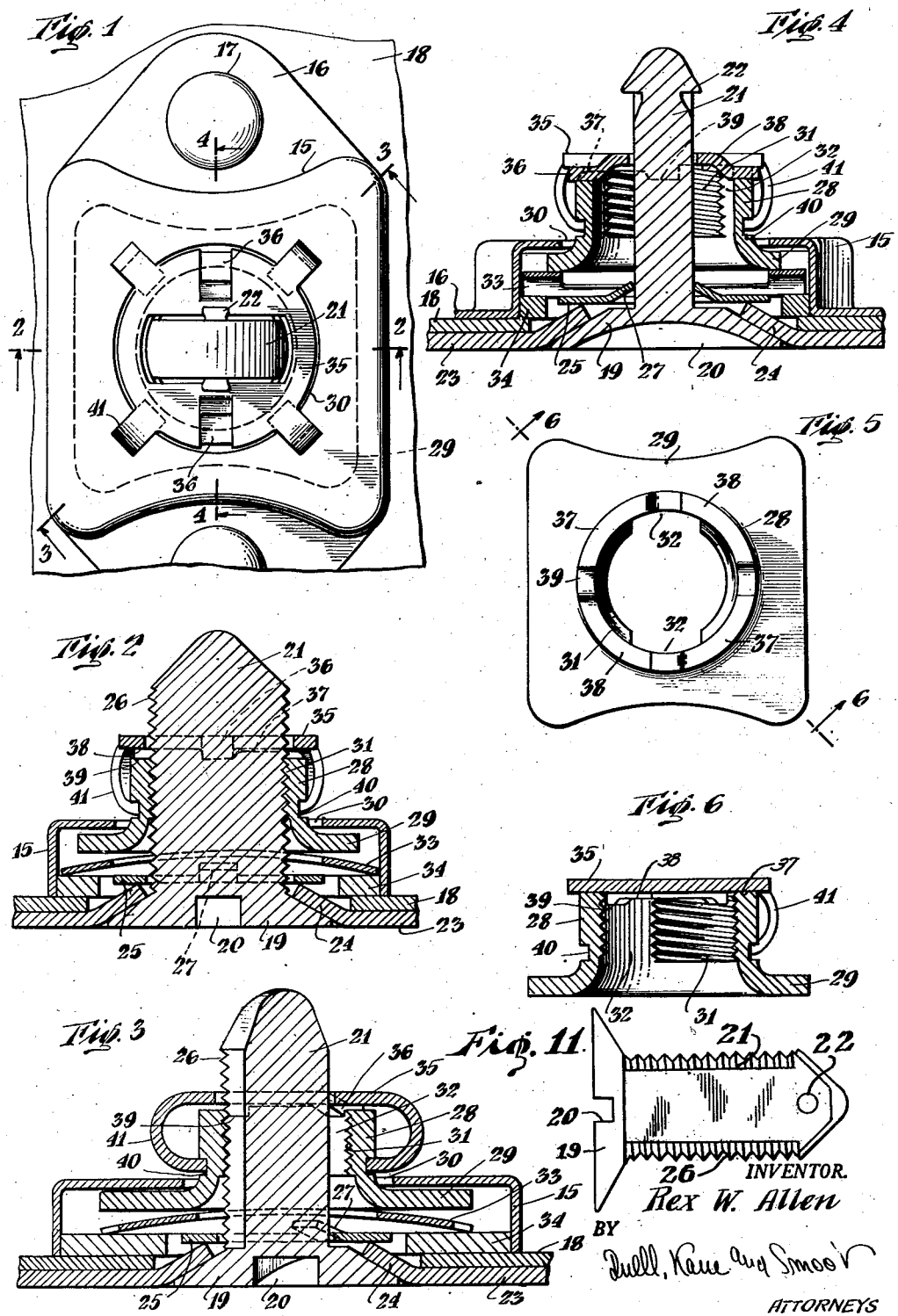

March 5, 1946.    R. W. ALLEN    2,396,142
FASTENER ASSEMBLY
Filed Jan. 19, 1944    2 Sheets-Sheet 2
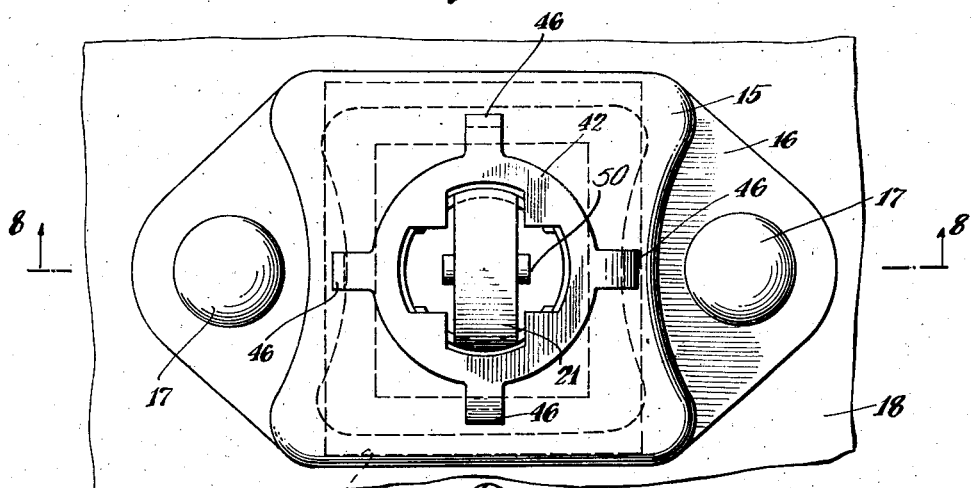
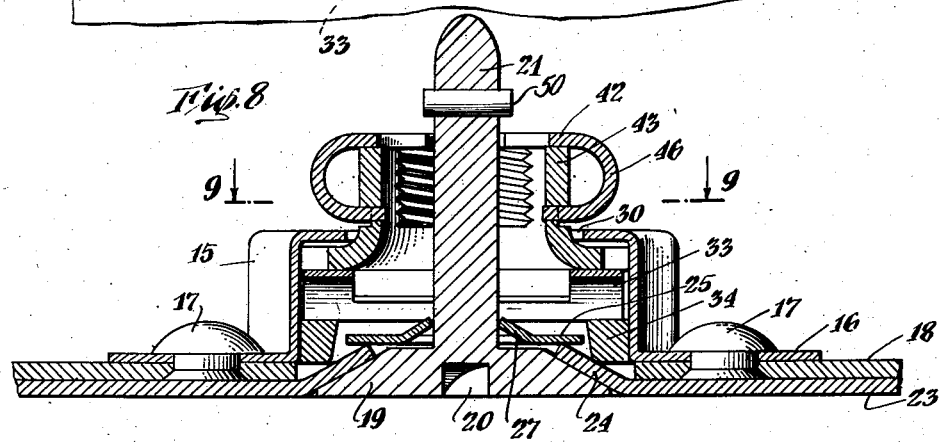
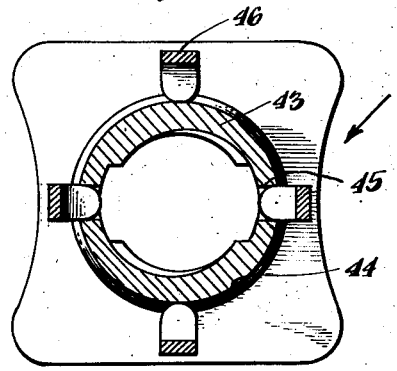
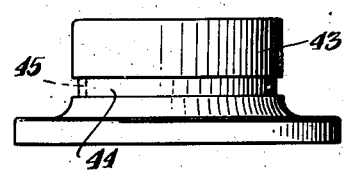
INVENTOR.
Rex W. Allen
BY
ATTORNEYS Patented Mar. 5, 1946

2,396,142

UNITED STATES PATENT OFFICE 2,396,142

FASTENER ASSEMBLY

Rex W. Allen, Palisades, N. Y., assignor to Camloc Fastener Corporation, New York, N. Y., a corporation of New York Application January 19, 1944, Serial No. 518,799

9 Claims. (Cl. 24—221)

This invention relates to a structurally and functionally improved fastener assembly and in its more specific aspects relates to an assembly of this character, the parts of which may readily be coupled and detached.

It is an object of the invention to furnish a structure of this nature and in which accidental shifting of the parts will be prevented by means of an improved detent or locking structure which may be readily incorporated in the assembly and when so incorporated will function over long periods of time with freedom from all difficulties.

A further object is that of providing a fastener assembly of such type and the parts of which will be relatively few in number and each individually simple and rugged in construction, such parts being capable of manufacture largely by automatic methods and machinery and, when assembled, providing a unitary article functioning over long periods of time with freedom from all difficulties.

With these and other objects in mind, reference is had to the attached sheets of drawings illustrating practical embodiments of the invention, and in which:

Fig. 1 is a bottom plan view of a fastener assembly;

Figs. 2, 3 and 4 are transverse sectional views taken respectively along the lines 2—2, 3—3 and 4—4 and in the direction of the arrows as indicated in Fig. 1;

Fig. 5 is a face view of the nut unit separated from the rest of the assembly;

Fig. 6 is a transverse sectional view taken along the lines 6—6 and in the direction of the arrows as indicated in Fig. 5;

Fig. 7 is a view similar to Fig. 1 but showing a slightly different form of construction;

Fig. 8 is a transverse sectional view taken along the lines 8—8 and in the direction of the arrows indicated in Fig. 7;

Fig. 9 is a sectional plan view taken along the lines 9—9 and in the direction of the arrows in Fig. 8; and Fig. 10 is a side elevation of the nut element employed in this assembly;

Fig. 11 is a side elevation of the stud element.

With primary reference to Fig. 1, it will be seen that the reference numeral 15 indicates a shell or casing conveniently provided with ears or extended portions 16 through which rivets 17 may extend to secure the casing to the sheet or mounting member 18. As illustrated in this figure, as well as in Figs. 2, 3 and 4, a stud member is provided which may include a head 19 formed with an implement-receiving recess 20 and from which head a shank 21 extends. Adjacent its end, the shank may be provided with a pair of ears 22 or any other suitable projections furnishing in effect a cross pin. Also, for the purpose of guiding the parts, the end of the shank is preferably rounded as illustrated.

This stud extends through an aperture formed in a sheet or other suitable mounting member. If a sheet is employed, it is preferably dimpled or depressed as indicated at 24 at points adjacent the aperture. To secure the stud against accidental detachment from this mounting and when the latter is separated from the sheet 18 or its equivalent, a retaining plate or element may be employed. This conveniently takes the form of an apertured disc 25. The shank 21 in cross section preferably presents relatively long and flat side faces from which the ears or equivalents 22 extend. The end edges of this shank are threaded as indicated at 26.

Accordingly, the aperture of disc 25 is of an area such that the shank may freely pass therethrough so as to slidably mount the disc. Ear portions 27 are formed preferably integral with the disc and define between them a space less than the distance between the outer ends of the ears 22 or their equivalents. Accordingly, while the retaining element may readily be applied to the shank, it will require a deliberate manual actuation of the parts to separate the elements. Therefore—the diameter of the disc 25 being in excess of the diameter of the aperture in sheet 23 or its equivalent—it follows that an accidental separation or detachment of the stud from this mounting will be prevented.

A nut such as is shown in Fig. 5 is employed as part of this assembly. This nut includes an annular body 28 and a base or flange portion 29. The latter defines an area less than the space within the shell 15 and the body 28 extends through an aperture 30 in the base of the shell. The diameter of this aperture is substantially in excess of the diameter of body 28. Accordingly, the nut is "floatingly" supported with respect to the shell and is capable of limited sidewise movements with respect to the same. Therefore, a centering structure is provided such that if the apertures of the sheets 18 and 23 are not precisely in alignment, the parts of the assembly will nevertheless cooperate. The nut bore presents threads 31 of preferably a steep pitch and these threads are interrupted as at 32. The area of the interruptions is in excess of the width of the shank 21.

Therefore, the shank may be projected through the bore of the nut and with its threaded edges 26 in line with the interruptions or grooves 32. A relative rotation of the nut and shank will, however, cause engagement of the threaded edges 26 with threads 31. To assure that the nut will normally be maintained in proper position with reference to the shell, a spring 33 may have bearing against the flange 29 and may also bear against a spacer plate 34 disposed within the shell. Thus, the nut is normally maintained in projected position.

Now with a view to providing a structure which will function as a detent or lock to prevent accidental rotation of the stud with respect to the nut, it will be observed that a locking plate 35 is employed. This plate may have tongues 36 displaced inwardly of its body and adapted to ride in contact with the edges of the body 28. This body edge is defined preferably by raised portions 37 located at diametrically opposite points and intermediate which relatively depressed portions 38 are provided; these portions being in turn defined with respect to their limits by grooves 39.

The under face of body 35 rides in contact with the relatively raised portions 37 while the tongues 36 bear against the relatively depressed portions and into the grooves or notches 39. Displacement of this plate is prevented by forming the exterior of body 28, for example, with a groove 40 within which the ends of fingers 41 extending from body 35 project.

Thus, while plate 35 may be freely rotated through a 90° angle, it will normally occupy positions at which its tongues 36 ride into one of the pair of notches 39. At the same time, a separation of the plates 35 will be prevented by the extensions 41. When the stud is not extended into the nut, the slot formed in the plate 35 will be in registry with the interruptions or grooves 32 of the nut.

In the form of construction shown in Figs. 7 to 10, the same general arrangement of parts has been utilized. For this reason, the similar elements have been designated by reference numerals heretofore employed in connection with Figs. 1 to 6. However, in this form of construction, the outer edge of the nut is not provided with relatively raised and recessed portions nor is it formed with notchces. Additionally, ribs or tongues 36 are not utilized.

Rather, the plate 42 is rotatably supported upon the nut body 43. The latter is formed with a groove 44 in its exterior face. This groove is provided with recesses shown in the drawings as notchces 45. Fingers 46 are formeed integral with plate 42 and ride not alone into the groove 44 but also into these notches. The plate 42 will be restrained from turning by fingers 46 snapping into notches 45 in one of two positions.

Shank 21 is further provided with a cross-pin 50, the terminals of which project beyond the opposed flat side walls of the shank, as shown in Fig. 8. When the shank is removed from the nut, these projecting terminals may engage ear portions 27 of apertured disc 25 positioned on the inner surface of sheet 23, and thus prevent the shank from being completely separated from sheet 23. If desired, the terminal portions may be formed integrally with the shank instead of providing the transverse cross-pin 50. In the illustrated embodiment these positions are spaced 90°. Obviously, in one of them the slot in plate 42 and which normally retains the shank will be aligned with the interrupted portions of the threads of the nut.

As is apparent in both forms of apparatus, and with the parts of the fastener secured to the members which are to mount the same, the stud may readily be projected through the bore of the nut. In such projection, it will enter and pass through the slot formed in the locking or detent plate. After the shank of the stud has been fully projected, the operator will rotate the stud. This will cause an interengagement of the threads and result in the nut's being drawn inwardly with respect to the shell and against the compression of the spring 33. This will secure the mounting members 18 and 23 against accidental displacement.

Simultaneously with the rotation of the stud the plate 35 or plate 42 will be rotated. In the first named type of construction, such rotation will cause the tongues 36 to ride out of the notches 39 and over the relatively depressed surfaces 38 to a point at which they enter the notches defining the opposite extremes of these surfaces. The surfaces 37 will act as stops to prevent further rotation. Therefore, the shank will be locked against accidental rotation. In the form of construction shown in Figs. 7 to 10 inclusive, the fingers or extensions 46, in addition to retaining the plate 42 in position and guiding the same, function—when projected into the notches 45—to lock the shank against accidental movement.

Thus, it is obvious that among others the several objects of the invention as specifically afore noted are achieved. It is apparent that numerous changes in construction and rearrangements of the parts might be resorted to without departing from the spirit of the invention as defined by the claims.

I claim:

1. In a fastener assembly, a nut member, a plate member, one of said members being formed with a groove, elements extending from the second of said members and bearing within said groove, whereby to rotatably support and retain one member with respect to the second of the same, relatively extending portions forming a part of one of said members, and the second of said members being formed with relatively recessed parts to receive said extended portions and whereby a detent structure is provided between said plate and nut members.

2. In a fastener assembly, a nut member, a plate member, one of said members being formed with a groove, elements extending from the second of said members and bearing within said groove, whereby to rotatably support one member with respect to the second of the same, said groove being formed with relatively recessed portions, and said elements being extendable into said portions to provide a detent structure between said plate and members.

3. In a fastener assembly, a nut member, a plate member, one of said members being formed with a groove, elements extending from the second of said members and bearing within said groove, whereby to rotatably support one member with respect to the second of the same, said plate and nut members being adapted to be disposed in face-to-face contact, the face of one of said members being formed with notches, and relatively projecting portions extending from the adjacent face of the second of said members and extending into said notches to provide a detent structure.

4. In a fastener assembly, a nut formed with an exterior groove, a plate, elements forming a part of said plate and bearing within said groove to rotatably support said plate with respect to said nut and adjacent the end of the latter, and said groove being formed with relatively recessed portions and the ends of said elements being extendable into such portions to provide a detent structure.

5. In a fastener assembly, a nut formed with an exterior groove, a plate, elements forming a part of said plate and bearing within said groove to rotatably support said plate with respect to said nut and adjacent the end of the latter, the end face of said nut being formed with notches, projections extending from the adjacent face of said plate, and said projections being adapted to ride into said notches to form a detent structure between said plate and nut.

6. In a fastener assembly, a nut formed with an exterior groove, a plate, elements forming a part of said plate and bearing within said groove to rotatably support said plate with respect to said nut and adjacent the end of the latter, the end of said nut presenting relatively projecting portions and relatively reduced portions, together with notches provided between such portions, and projections formed in the adjacent face of said plate and adapted to ride in contact with the relatively reduced portion and notches.

7. In a fastener assembly, a nut formed with an exterior groove, a plate, elements forming a part of said plate and bearing within said groove to rotatably support said plate with respect to said nut and adjacent the end of the latter, the end of said nut presenting relatively projecting portions and relatively reduced portions, together with notches provided between such portions, and projections formed in the adjacent face of said plate and adapted to ride in contact with the relatively reduced portion and notches; the relatively projected portions of said nut defining stop elements in cooperation with said plate to limit rotation of the latter.

8. In a fastener assembly, a shell formed with an aperture, a nut disposed within said shell and extending through said aperture, a plate rotatably supported upon the projecting end portion of said nut, said plate being formed with a stud-accommodating slot, and means furnishing a detent structure to restrain rotational movement of said plate with reference to said nut.

9. In a fastener assembly, a shell formed with an aperture, a nut disposed within said shell and extending through said aperture, a plate rotatably supported upon the projecting end portion of said nut, said plate being formed with a stud-accommodating slot, the threads of said nut being interrupted by grooves, and means providing a detent structure between said plate and nut and whereby the former will be restrained from movement with respect to the latter and when its slot is in registry with the nut-grooves.

REX W. ALLEN.